United States Patent

[11] 3,622,173

[72] Inventor Donald W. Hodgson
 1646 10th St., Arcata, Calif. 95521
[21] Appl. No. 872,138
[22] Filed Oct. 29, 1969
[45] Patented Nov. 23, 1971
 Continuation-in-part of application Ser. No.
 771,263, Oct. 28, 1968, now abandoned,
 which is a continuation-in-part of
 application Ser. No. 679,482, Oct. 31,
 1967, Pat. No. 3,463,512. This application
 Oct. 29, 1969, Ser. No. 872,138

[54] FULL TRAILER FIFTH WHEEL WITH GREASE RESERVOIR
 5 Claims, 5 Drawing Figs.
[52] U.S. Cl. ................................................. 280/125,
 280/433, 308/137
[51] Int. Cl. ........................................................ B62d 53/00
[50] Field of Search ........................................... 280/125,
 433; 308/136, 137

[56] References Cited
 UNITED STATES PATENTS
| 614,629 | 11/1898 | Senderling | 280/127 |
| 937,657 | 10/1909 | Streich | 280/62 |
| 2,285,784 | 6/1942 | Scott | 308/137 |
| 2,481,695 | 9/1949 | Scott | 308/137 |
| 3,075,816 | 1/1963 | Harris et al. | 308/135 |
| 3,096,099 | 7/1963 | Bowles et al. | 280/125 |
| 3,325,185 | 6/1967 | Higby | 280/432 |

Primary Examiner—Leo Friaglia
Attorneys—Clarence A. O'Brien and Harvey B. Jacobson ABSTRACT: A pair of annular plates for securement to a full trailer frame and the front axle bolster of the frame and including opposing concentric circular grooves and ridges. The ridges formed on one of the plates are nested in the grooves of the other plate and retaining structure is provided for preventing axial separation of the plates. In addition, the bottom surfaces of each of the grooves have circumferentially spaced recesses or relieved areas formed therein and the upper faces of the ridges are also provided with similar circumferentially spaced recesses or relieved areas. The relieved areas in the grooves and ridges are spaced relative to each other in a manner such that they are out of registry when the steerable front wheels of the trailer are positioned in straight-ahead positions and the plates include lubricating passages through which lubricating material may be forced between the opposing axially facing surfaces of the grooves and ridges.

PATENTED NOV 23 1971 3,622,173

Donald W. Hodgson
INVENTOR.

BY Clarence A. O'Brien
and Harvey B. Jacobson
Attorneys 3,622,173

FULL TRAILER FIFTH WHEEL WITH GREASE RESERVOIR

This application comprises a continuation-in-part of my copending U.S. application Ser. No. 771,263 for "Full Trailer Fifth Wheel," filed Oct. 28, 1968 and now abandoned and which is in turn a continuation-in-part of my prior U.S. application Ser. No. 679,482, for "Fifth Wheel Construction," filed Oct. 31, 1967 now U.S. Pat. No. 3,463,512, dated Aug. 26, 1969.

The fifth wheel has been designed as a means for more efficiently transferring the pull on the front axle or bolster of a full trailer to the trailer frame. The fifth wheel includes coacting bearing surfaces for transferring this pull and the bearing surfaces provided are many times greater in effective bearing surface area than conventional bearing surfaces provided by only a pivot pin such as that conventionally utilized to oscillatably support the front axle of a full trailer from the frame of the trailer.

The fifth wheel not only includes radial thrust bearing surfaces considerably greater in area but also includes axial thrust bearing surfaces which may be as large in area as desired in order to support the forward portion of the weight of the trailer from the front axle of the trailer.

The axial thrust bearing surfaces are defined by concentric circular ridges seated in concentric circular grooves and the opposing axial faces of the ridges and grooves include grooves and recesses defining lubrication passages and lubricating fluid reservoirs by which full lubrication of the axial and radial thrust bearing surfaces is assured. Further, the plates include lubricating bores which may be provided with suitable lubricating fittings and extend to the lubricating passages and recesses by which lubricating fluids under pressure may be directed under pressure to the lubricating passages and recesses from the exterior of the fifth wheel without disassembly of the latter.

The main object of this invention is to provide a fifth wheel including cooperating journal bearing surfaces operable to transfer the pull of a towing vehicle on the front axle of a trailer to the frame of the trailer and which have a total area considerably greater than the bearing surface area of a conventional fifth wheel pin.

Another object of this invention is to provide a fifth wheel construction in accordance with the preceding object and including a novel retaining ring structure for maintaining the upper and lower plates of the fifth wheel against axial separation relative to each other.

Yet another object of this invention is to provide a fifth wheel construction including improved lubricating features whereby all of the bearing surfaces thereof may be readily lubricated as a regular maintenance procedure.

A still further object of this invention, in accordance with the immediately preceding object, is to provide a fifth wheel construction whose lubricating means enable the fifth wheel construction to store considerable quantities of lubricating fluids, whereby the periods between consecutive lubrication maintenance procedures may be greatly extended.

A final object of this invention to be specifically enumerated herein is to provide a fifth wheel construction which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
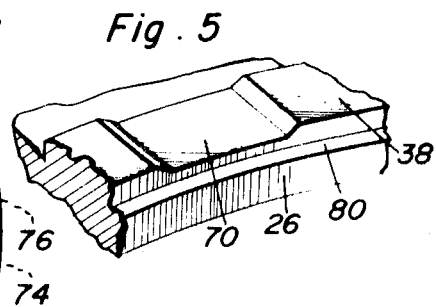
Figure 4:
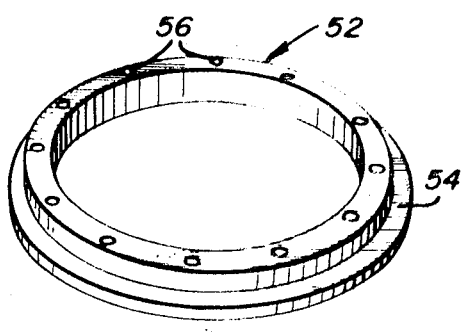

FIG. 4 is a perspective view of the retaining ring utilized to maintain the upper and lower plates of the fifth wheel against axial separation; and FIG. 5 is a fragmentary perspective view of the inner peripheral portion of the lower plate illustrating the manner in which the ridges of the lower plate are provided with circumferentially spaced recesses or relieved areas for forming reservoirs for lubricating fluids.

Referring now more specifically to the drawings, the numeral 10 generally designates a full trailer including a main frame provided with longitudinal frame rails 12 and 14. The trailer 10 includes a body generally referred to by the reference numeral 16 which is disposed over and supported from the main frame rails 12 and 14.

A front axle beam or bolster is referred to in general by the reference numeral 18 and includes a central relieved portion 20 into which a lower portion of the fifth wheel 22 of the instant invention projects.

The fifth wheel 22 includes an upper annular plate 24 and a lower annular plate 26. The upper plate 24 includes a plurality of concentric circular ridges or flanges 28, 30 and 32 defining concentric grooves 34 and 36 therebetween. The lower plate includes a plurality of concentric circular ridges 38 and 40 defining a groove 42 therebetween and the upper plate 24 is secured to the longitudinal frame members 12 and 14 in any convenient manner such as by welding 44 with the upper plate 24 inverted relative to the lower plate 26. The lower plate 26 is welded in an upwardly opening recess 46 formed in the upper surface of the bolster 18 and the ridges 38 and 40 are snugly received in the grooves 34 and 36 while the ridge 30 is received in the groove 42.

The undersurfaces of the upper ridges 28, 30 and 32 are coplanar and oppose the upper surface portions of the lower plate 26 inwardly of the ridge 38, defining the bottom of groove 42 and disposed outwardly of the rib 40 respectively. However, the extreme outer peripheral edge portion of the plate 26 includes an upstanding peripheral flange 50 which snugly embraces the outer peripheral surface of the outer rib 32 of the upper plate 24. In this manner, both radial and axial thrust bearing surfaces of considerable area are provided on the plates 24 and 26.

Figure 1:
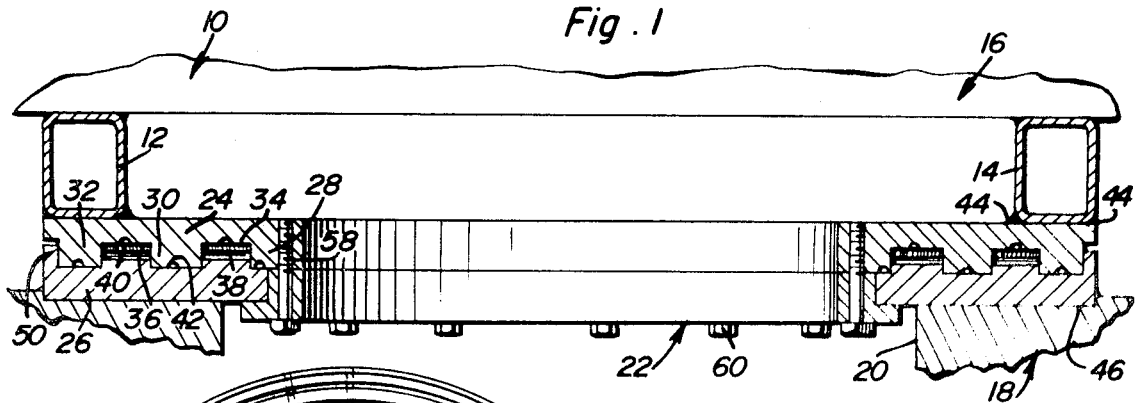
FIG. 1 is a fragmentary transverse vertical sectional view taken substantially upon a plane passing through the center of a full trailer fifth wheel construction exemplifying the improvements of the instant invention.

A retaining ring generally referred to by the reference numeral 52 is provided and includes a radially outwardly projecting circumferential flange 54. The ring 52 further includes circumferentially spaced axially extending bores 56 formed therethrough and similar circumferentially spaced threaded bores 58 are formed about the inner periphery of the upper plate 24. The inside diameter of the lower plate 26 is slightly greater than the outside diameter of the retaining ring above the flange 54 thereof and the axial extent of the ring 52 above the flange 54 is slightly greater than the axial thickness of the plate 26, exclusive of the ribs 38 and 40. Accordingly, the ring 52 may be positioned as illustrated in FIG. 1 of the drawings and secured to the upper plate 24 by means of a plurality of threaded fasteners 60 passed upwardly through the bores or apertures 56 and threadedly engaged in the threaded bores 58. When secured in this manner, the retaining ring flange 54 underlies the inner periphery of the lower plate 26 and thereby prevents axial separation of the plates 24 and 26.

Figure 2:
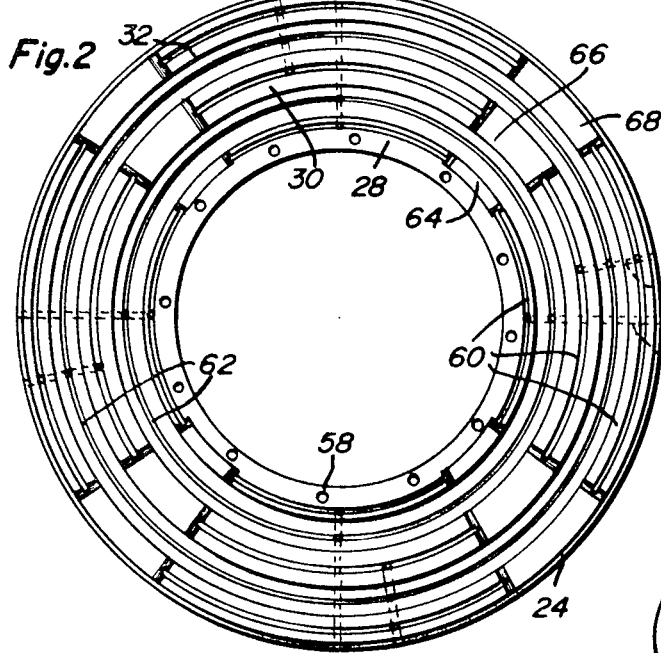
FIG. 2 is a bottom plan view of the upper plate of the fifth wheel.
Figure 3:
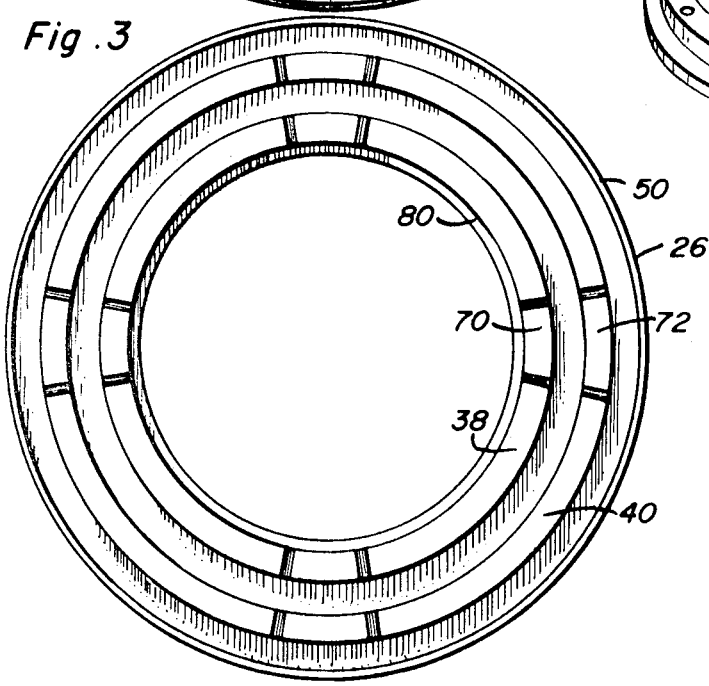
FIG. 3 is a top plan view of the lower plate of the fifth wheel.

With attention now invited more specifically to FIGS. 2, 3 and 5 of the drawings, it may be seen that the ridges 28, 30 and 32 have grooves 60 formed therein and that the bottom walls of the grooves 34 and 36 have similar grooves 62 formed therein and extending thereabout. Also, the ridges 28, 30 and 32 have a plurality of sets of radially registered recesses or relieved areas 64, 66 and 68 formed therein at locations spaced circumferentially thereabout. Still further, the ridges 38 and 40 also have sets of radially registered recesses or relieved areas 70 and 72 formed therein. From a comparison of FIGS. 2 and 3 of the drawings it may be seen that the sets of relieved areas 64, 66 and 68 are out of registry with the sets of relieved areas 70 and 72 when the plates are interfitted together and the bolster 18 is rotated to a position so that the ground engaging wheels (not shown) supported from the bolster are in the straightforward positions.

The upper plate 24 includes a plurality of radially extending lubricating bores 74 and 76 spaced circumferentially thereabout and which open outwardly through the outer peripheral edge of the upper plate 24 and inwardly into the grooves 60 and 62. The outer ends of the lubricating passages or bores 74 and 76 may be provided with any suitable form of lubricating fittings (not shown) and it will be noted that any lubricating fluid forced into the passages or bores 74 and 76 will be ducted to the grooves 60 and 62 as well as the recesses 64, 66, 68, 70 and 72. Accordingly, a large amount of lubricating fluids may be retained within the fifth wheel 22 for extended periods of use between maintenance lubrication operations.

The outermost rib or ridge 32 is spaced inwardly from the outer periphery of the upper plate 24 so as to provide a relieved area for receiving the flange 50 and it may be seen from FIG. 2 of the drawings that the recesses or relieved areas 64 do not open through the inner periphery of the upper plate 24. Further, the inner rib or ridge 38 is spaced from the inner periphery of the lower plate 26 whereby the inner peripheral portion of the inner rib 28 bears downwardly upon the inner peripheral portion 80 of the upper surface of the lower plate 26. The central relieved portion 20 of the bolster 18 provides access to the fasteners 60 and if it is desired O-ring seals (not shown) may be used between the confronting inner and outer peripheral portions of the upper and lower plates 24 and 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, first and second rotatable members, first and second plates secured to said first and second members said plates including means defining concentric circular ridges and grooves including generally annular and planar top and bottom surfaces, respectively, said plates being disposed in superposed relation with said ridges snugly received and seated in said grooves, at least some of said annular surfaces including narrow circumferential grooves formed therein, and means for admitting lubricating fluids into said grooves from the exterior of said plates, and means releasably securing said plates together against separation, one of said plates being annular in configuration, the last mentioned means including a retaining ring extending about one of the peripheral edges of said one plate and including portions thereof overlying the surfaces of said one plate remote from the other plate and extending about said one peripheral edge, and means removably securing said ring to the other of said plates.

2. The combination of claim 1 wherein the plate opposing the plate having the largest diameter ridge includes a peripherally extending circular flange embracing the radial outermost surfaces of the largest diameter ridge.

3. The combination of claim 1 wherein said one peripheral edge of said one plate comprises the inner peripheral edge thereof.

4. The combination of claim 3 wherein said some of said annular surfaces include relieved areas spaced circumferentially thereabout into which said narrow grooves open.

5. The combination of claim 4 wherein said relieved areas extend the full width of said some annular surfaces.

* * * * *